(12) United States Patent
Hamilton et al.

(10) Patent No.: US 11,784,993 B2
(45) Date of Patent: Oct. 10, 2023

(54) CROSS SITE REQUEST FORGERY (CSRF) PROTECTION FOR WEB BROWSERS

(71) Applicant: Cisco Technology, Inc., San Jose, CA (US)

(72) Inventors: Iain Maclachlan Hamilton, Argyll & Bute (GB); Kousik Nandy, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 17/202,871

(22) Filed: Mar. 16, 2021

(65) Prior Publication Data
US 2022/0191193 A1  Jun. 16, 2022

(51) Int. Cl.
*H04L 9/40* (2022.01)
*G06F 9/54* (2006.01)
(Continued)

(52) U.S. Cl.
CPC .......... *H04L 63/0807* (2013.01); *G06F 9/547* (2013.01); *H04L 9/3213* (2013.01);
(Continued)

(58) Field of Classification Search
CPC . H04L 63/0807; H04L 9/3213; H04L 63/029; H04L 63/0853; H04W 12/06; G06F 9/547
See application file for complete search history.

(56) References Cited

U.S. PATENT DOCUMENTS 11,677,846 B1 * 6/2023 Howes ................ H04L 63/0428
709/224
2006/0112422 A1 * 5/2006 Tevosyan ............ H04L 63/0807
726/9
(Continued)

FOREIGN PATENT DOCUMENTS

CN          102831339 B      12/2012

OTHER PUBLICATIONS

Rankothge, W.H.; Randeniya, S.M.N.; "Identification and Mitigation Tool for Cross-Site Request Forgery (CSRF)," 2020 IEEE 8th R10 Humanitarian Technology Conference (R10-HTC), Kuching, Malaysia, 2020, pp. 1-5, doi: 10.1109/R10-HTC49770.2020.9357029.*

(Continued)

*Primary Examiner* — Victor Lesniewski
(74) *Attorney, Agent, or Firm* — Lee & Hayes, P.C.

(57) ABSTRACT

Techniques are described for providing an application programming interface (API) architecture that is capable of supporting cross-site request forgery (CSRF) protection with an attribute flag in a cookie, for client devices that utilize a stateless user session to interface with an API gateway. A client device may transmit session requests received by an API gateway. The API gateway may generate a session, and a cookie including session properties associated with the session. The cookie may further include the attribute flag associated with a CSRF token. By transmitting the cookie with the attribute flag to the client device, the client device may receive and insert the cookie into subse- (Continued)

quent requests to indicate a requirement that the subsequent requests be accompanied by the CSRF token. In this way, the API gateway may utilize the attribute flag indicating the requirement for the CSRF token to protect the client device from malicious attacks.

20 Claims, 10 Drawing Sheets

(51) Int. Cl.
*H04L 9/32* (2006.01)
*H04W 12/06* (2021.01)
(52) U.S. Cl.
CPC ........ *H04L 63/029* (2013.01); *H04L 63/0853* (2013.01); *H04W 12/06* (2013.01)

(56) References Cited

U.S. PATENT DOCUMENTS

| | | | |
|---|---|---|---|
| 2008/0052775 A1* | 2/2008 | Sandhu | G06F 21/6263 726/14 |
| 2008/0320567 A1* | 12/2008 | Shulman | H04L 63/1441 726/4 |
| 2010/0100927 A1 | 4/2010 | Bhola et al. | |
| 2011/0258704 A1* | 10/2011 | Ichnowski | G06F 21/6227 726/26 |
| 2012/0023377 A1* | 1/2012 | Garskof | G06F 21/44 714/48 |
| 2012/0054846 A1* | 3/2012 | Lightsey | H04L 67/14 726/9 |
| 2013/0198294 A1* | 8/2013 | Gallagher | H04L 63/0807 709/206 |
| 2016/0156700 A1* | 6/2016 | Chen | H04L 63/107 726/3 |
| 2016/0366172 A1* | 12/2016 | Yadav | H04L 63/126 |
| 2017/0149783 A1* | 5/2017 | Dayka | H04L 63/10 |
| 2017/0223051 A1 | 8/2017 | Krapf et al. | |
| 2018/0302406 A1* | 10/2018 | Burckhardt | H04L 63/1441 |
| 2018/0351986 A1 | 12/2018 | Johns | |
| 2019/0095598 A1* | 3/2019 | Kobayashi | G06F 21/44 |
| 2019/0103968 A1* | 4/2019 | Srinivasan | H04L 9/0894 |
| 2019/0354709 A1* | 11/2019 | Brinskelle | G06F 21/31 |
| 2019/0373016 A1* | 12/2019 | Kitchen | H04L 63/168 |
| 2021/0211469 A1* | 7/2021 | Okunlola | H04L 63/102 |

OTHER PUBLICATIONS

Yadav, Pratibha; Parekh, Chandresh D.; "A report on CSRF security challenges & prevention techniques," 2017 International Conference on Innovations in Information, Embedded and Communication Systems (ICIIECS), Coimbatore, India, 2017, pp. 1-4, doi: 10.1109/ICIIECS.2017.8275852.*

Li, Wanpeng; Mitchell, Chris J.; Chen, Thomas; "Mitigating CSRF attacks on OAuth 2.0 Systems," 2018 16th Annual Conference on Privacy, Security and Trust (PST), Belfast, Ireland, 2018, pp. 1-5, doi: 10.1109/PST.2018.8514180.*

* cited by examiner

CROSS SITE REQUEST FORGERY (CSRF) PROTECTION FOR WEB BROWSERS

RELATED APPLICATIONS

This application claims priority to Indian Provisional Patent Application No. 20204105696 filed on Dec. 16, 2020, the entire contents of which are incorporated herein by reference.

TECHNICAL FIELD

The present disclosure relates generally to preventing malicious attacks to a communication session established between a client and an application programming interface (API) gateway server using cookies.

BACKGROUND

Internet cookies created by application programming interface (API) endpoints (e.g., gateways) may be utilized to track, personalize, and save information about clients accessing API services. An API gateway may create a cookie to extend a session across multiple successive API requests. The session managed by the API gateway may be utilized by a client device to exchange data with file transfer servers over the internet. The API gateway may act as a reverse proxy to receive an API request from the client device, execute API services to fulfill the API request, and transmit a response to the client device. The API gateway may utilize cookies to implement user authentication and protect the API services from abuse. A cookie may be a text file including data created by the API gateway at a beginning of a session. The data may be utilized by a website to recognize a user and recall individual login information and preferences associated with the user. The data may be labeled with unique identifiers of the user and a client device connected to a computer network to access the internet. The unique identifiers may enable the API gateway to determine information utilized to provide the API services. The data may be utilized to verify the authenticity of the API requests received from the client device based on user selection of links in the browser of the link device, and may include a username and a password.

Due to the widespread use and necessity of websites, hackers and other malicious entities use user sessions to obtain private information about users. These malicious entities continue to employ more frequent and sophisticated social-engineering techniques for deception and impersonation. Cookies may be altered, hijacked to steal the browser session or impersonate the user to gain unauthorized access or commit fraudulent acts. The cookies may be used to track a surfing history of the user. Disguised links may be inserted into messages by malicious entities and utilized to control a browser of the user to access a uniform resource locator (URL). The disguised links may be utilized by the malicious entities to deceive the user into selecting the disguised links. The disguised links, being inadvertently selected by the user, may cause requests to be transmitted by the browser, resulting in the API gateway automatically authenticating and authorizing the user.

Accordingly, to prevent such automatic authentication and authorization of the user by the API gateway, cross-site request forgery (CSRF) tokens may be utilized by the browser and required by the API gateway for the authentication and authorization. The API gateway may receive the previously saved cookie, and then authenticate and authorize the user based on a valid CSRF token being received. On the other hand, the API gateway may receive the previously saved cookie, and then refrain from authenticating and authorizing the user based on a valid CSRF token not being received (e.g., an invalid token being received, or no CSRF token being received).

The CSRF tokens may be included in API requests to defend against malicious attacks. The CSRF tokens may be tied to sessions and validated prior to the API gateways executing relevant actions. A CSRF token may be a unique, secret, unpredictable value that is generated by a server-side application in a backend and transmitted to a client device. The client device may receive the CSRF token from an API gateway and transmit the CSRF token along with a cookie in subsequent API requests. The API requests may be authenticated by extracting the CSRF token from the API requests and verifying a value of a parameter in the CSRF token. However, with the rapid increase in the frequency and sophistication of attacks, vulnerabilities in CSRF protection may be exploited to have unauthorized requests processed due to CSRF token validation errors. Requests of certain types may be processed by API gateways without validation, notwithstanding the requests being made based on malicious links. Requests omitting CSRF tokens may be processed without validation, due to the API gateways not being able to determine whether verification of the requests having been sent without the CSRF tokens is necessary.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
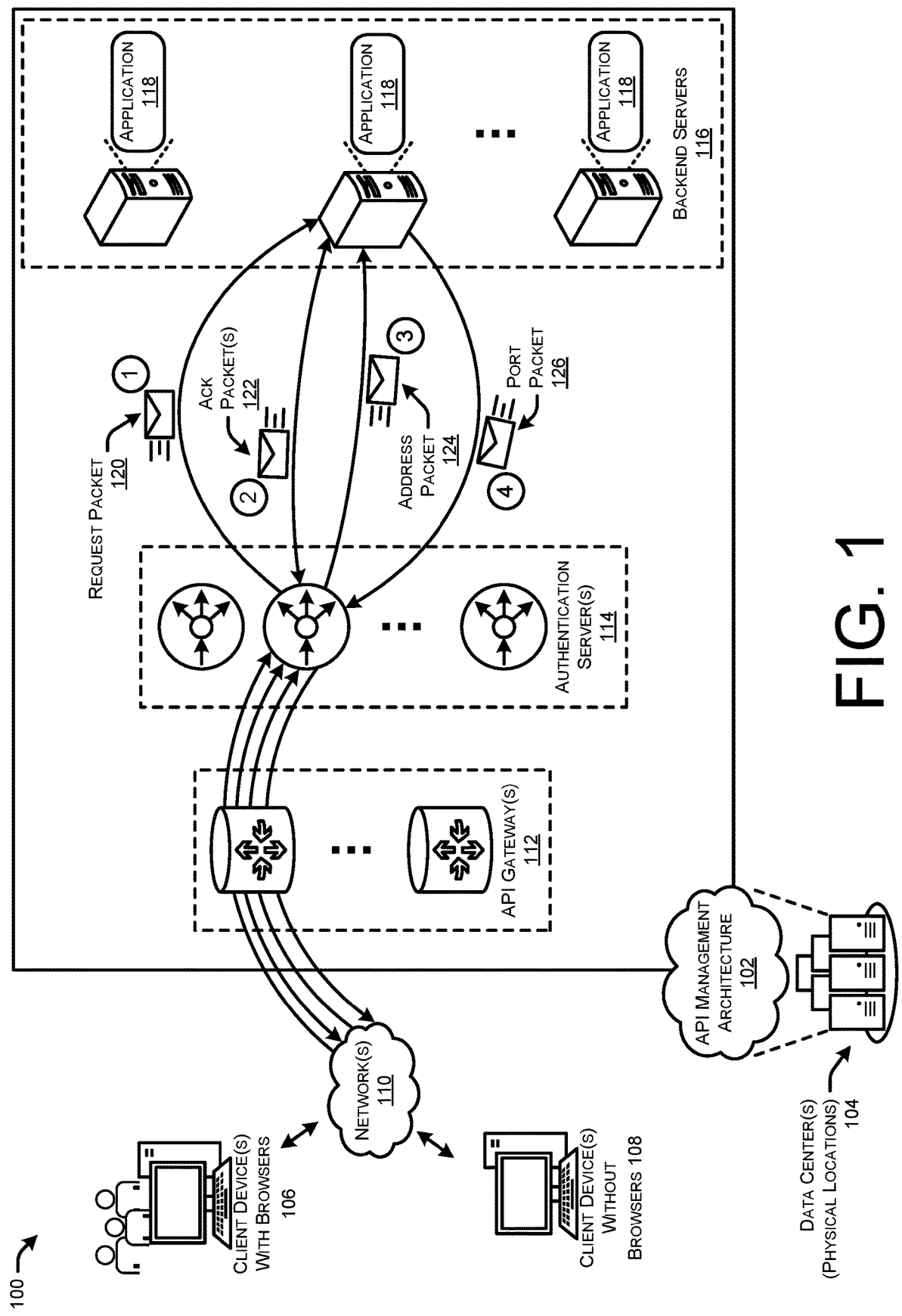
FIG. 1 illustrates a system-architecture diagram of an example application programming interface (API) management architecture that supports cross-site request forgery (CSRF) protection with an attribute flag in a cookie, for client devices that utilize a user session to interface with an API gateway.

This disclosure describes techniques for providing an application programming interface (API) architecture that is capable of supporting cross-site request forgery (CSRF) protection with an attribute flag in a cookie, for client devices that utilize a stateless user session to interface with an API gateway. A method to perform techniques described herein includes receiving an authentication request; generating a CSRF token based on an internal secret; generating a session based on the authentication request. The session may be generated based on the session being hashed with the internal secret. Further, the method may include generating a cookie including session properties associated with the session. The cookie may further include an attribute flag associated with the CSRF token. Further, the method may include transmitting an authentication response comprising the cookie and the CSRF token; receiving an operation request to perform a first operation; determining whether or not the CSRF token and the attribute flag are received along with the operation request; and performing the first operation based on the CSRF token and the attribute flag received along with the operation request, or a second operation based on the CSRF token not being received along with the operation request.

Additionally, the techniques described herein may be performed by a system and/or device having non-transitory computer-readable media storing computer-executable instructions that, when executed by one or more processors, performs the method described above.

Example Embodiments

API management architectures have provided means for managing API tasks including request traffic, authentication, and authorization. Traditionally, an API management architecture includes networks of servers that implement security analysis to safeguard client devices from unwanted access, data breaches, hacks, and mistakes. The security analysis may include generating a CSRF token, which may be a unique, secret, and unpredictable value, that is transmitted to a client for inclusion along with subsequent requests.

In order to implement security analysis in servers hosting API management applications, the servers may receive requests from client devices and validate the requests. In this way, the servers may respond to the requests by determining whether the requests were received based on authentic links (also referred to herein as "valid links") of browsers being selected by users of client devices. For example, when a client device sends a request for a connection to a server hosting an application, the server inspects security data provided along with the request. The server then executes services associated with the request, based on the security data including a token that indicates the request was received based on user selection of an authentic link in a browser of the client device.

Ideally, API management architectures need to include minimal processing to provide security analysis, such as by generating CSRF tokens upon receipt of requests from client devices. The CSRF tokens may be generated, along with small portions of data generated as text files, based on the requests received from the client devices. The text files may be implemented as cookies and include identification information associated with the client devices. In this way, API management architectures may utilize the CSRF tokens to provide protection for the client devices and utilize the cookies to improve quality of experiences perceived by the client devices. However, the security analysis performed by API management architectures suffer from various vulnerabilities, such as CSRF token validation being bypassed by certain types of requests, skipped for requests omitting CSRF tokens, sidetracked for certain types of applications allowing validation of a different CSRF token obtained by an attacker, and so forth. Accordingly, API management architectures are unable to provide effective CSRF protection against malicious attacks. As described herein, the term "malicious" may be applied to data, actions, attackers, entities, emails, etc., and the term "malicious" may generally correspond to spam, phishing, spoofing, malware, viruses, and/or any other type of data, entities, or actions that may be considered or viewed as unwanted, negative, harmful, etc., for a client device associated with a user session.

This disclosure describes techniques for an API management architecture that is capable of providing CSRF protection for a client device connecting to a backend service. The API management architecture may receive a request from the client device and generate a cookie including an attribute flag, based on the request. A value of the attribute flag in a response may indicate whether subsequent requests need to be accompanied by a CSRF token. The CSRF token may be utilized to provide protection from CSRF attacks. The cookie may be stateless. For example, requests including cookies may be processed similarly or identically regardless of the requests being received from client devices of different types (e.g. user devices or network devices), based on the cookies being stateless. The client device from which the request is received may include a client device of a type susceptible to CSRF attacks or a client device of a type not susceptible to CSRF attacks. The CSRF indicator and/or the attribute flag may be utilized to determine whether to provide CSRF protection based on the type of the client device from which the request is received.

The attribute flag may be set based on a header within the request. The header may include an indicator (e.g., a CSRF indicator) associated with CSRF protection, and may be received as part of the request, along with the username and password. The CSRF indicator in the header may indicate that CSRF protection is required based on the CSRF indicator having a value of true (e.g., "1"). The attribute flag in the cookie may be set as true based on the value of the CSRF indicator in the header being true. The CSRF indicator in the header may indicate that no CSRF protection is required based on the CSRF indicator having a value of false (e.g., "0"). The attribute flag in the cookie may be set as false based on the value of the CSRF indicator in the header being false. The CSRF indicator may be utilized to generate the cookie with the attribute flag being set as true to indicate that CSRF protection is necessary, based on the CSRF indicator having the value of true. The attribute flag being set as true may be associated with the client device susceptible to CSRF attacks. The request may include the cookie with the attribute flag set as false to indicate that no CSRF protection is necessary, based on the CSRF indicator having the value of false. The attribute flag set as false may be associated with the client device not susceptible to CSRF attacks.

The request received from the client device may be analyzed to determine whether to establish a session with the client device based on the indicator in the header. Requests may be processed similarly regardless of the types of client devices from which the requests are received. The request may be analyzed to determine to establish the session associated with the CSRF indicator being set as true and CSRF protection being necessary. The client device may be connected to an API gateway of the API management architecture to enable execution of API services, based on the value of the CSRF indicator being true and the session being established with CSRF protection. The request may be analyzed to determine to establish the session based on the CSRF indicator being set as false and CSRF protection not being necessary. The client device may be connected to an API gateway (also referred to herein as "an API gateway server") of the API management architecture to enable execution of API services, based on the value of the CSRF indicator being false and the session being established without CSRF protection. The request may be received by the API gateway and analyzed by the API gateway or a backend of the API management architecture.

In this way, the security analysis performed on the requests received from the client devices may be stateless. By way of the security analysis being stateless, computing resources executing the security analysis for devices of a variety of types may be simplified and minimized. Client devices that are susceptible to CSRF attacks and that transmits requests to establish API session may be protected. Client devices susceptible to CSRF attacks may include user devices with browsers. The browsers may include two layers (e.g., separate layers). The layers may include layers (e.g., first layers) that are built-in request/reply implementations (e.g., built-in functions in the user devices) and that have access to cookies but not CSRF tokens. The layers may include layers (e.g., second layers) that are an application layers (e.g., JavaScript engines), that do not have access to cookies, and that can access CSRF tokens. Both the first layers and the second layers may work together to submit the cookies and the CSRF tokens. In some examples, the user devices may be inoperable for sending both of the cookies and the CSRF tokens, without the first layers and the second layers working together. The user devices may be susceptible to malicious attacks that exploit the built-in functions to cause the browsers to submit the cookies but not the CSRF tokens. The browser may be caused to submit the cookies but not the CSRF tokens, based on malicious links that are inadvertently selected by users of the user devices.

Client devices not susceptible to CSRF attacks may transmit requests to establish sessions in a similar way as for client devices susceptible to CSRF attacks. Client devices not susceptible to CSRF attacks may transmit the requests without including the CSRF indicator in the header, or with the CSRF indicator being included in the header and set as false instead of true. Client devices not susceptible to CSRF attacks may include network devices.

A response may be transmitted to the client device with a CSRF token based on the session being established with CSRF protection. In some examples, the response may be transmitted based on determining the CSRF indicator is included in the header, and that the session is established. In some examples, the response may be transmitted based on determining the CSRF indicator in the header is set as true. The attribute flag may be set as true, based on the request. The response may be transmitted along with the cookie and accompanied by the CSRF token, based on the attribute flag being set as true. The attribute flag in the response being set as true may indicate that the response must be accompanied by the CSRF token. By utilizing the attribute flag to indicate that the CSRF token is required (e.g., to require the CSRF token), malicious attacks that exploit the built-in functions of the user devices to cause the browsers to submit the cookies but not the CSRF tokens may be thwarted. The response may be utilized by the client device to send subsequent requests for API services with the CSRF protection. The API gateway may refrain from transmitting the response based on determining the attribute flag in the cookie is set as true and that the CSRF token is not authentic. In some examples, a response to an authentic client device may be transmitted, the response indicating that the request with the CSRF indicator in the header set as false was received based on a malicious link.

A response may be transmitted to the client device without any CSRF token based on the session being established without CSRF protection. The attribute flag in the response being set as false may indicate that the response does not need to be accompanied by the CSRF token. The response may be utilized by the client device to send subsequent requests for API services without the CSRF protection. The client device utilizing the response to send the subsequent requests for API services without CSRF protection may be a network device not susceptible to CSRF attacks.

The API gateway may receive subsequent requests transmitted from the client device. Any number of subsequent requests may be transmitted by the client devices and received by the API gateway based on the session being established. In some examples, subsequent requests may include the cookie with the attribute flag set as true, based on the session request being received from the client device requiring CSRF protection. The API gateway may process the subsequent requests with the attribute flag set as true, only if the requests are received with the CSRF token being validated as authentic (e.g., validated as an authentic CSRF token (also referred to herein as "a valid CSRF token")). The API gateway may refrain from executing API services based on the subsequent requests with the attribute flag set as true, if the requests are received with the CSRF token being determined as not authentic. The API gateway may refrain from executing API services based on the subsequent requests with the attribute flag set as true, if the requests are received without any CSRF token. The API gateway may transmit a response to the client device to indicate that validation of the CSRF token was not successful, based on determining the attribute flag in the cookie is set as true and that the CSRF token received in the request based on the user inadvertently selecting on the malicious link is not authentic. Alternatively, the API gateway may refrain from transmitting the response or transmit the response to the client device indicating that validation of the CSRF token was not successful, based on determining the attribute flag in the cookie is set as true and that no CSRF token was received in the request based on the malicious link.

In some examples, the API gateway may receive subsequent requests including the cookie with the attribute flag set as false, based on the session request being received from the client device not requiring CSRF protection. The subsequent requests including the cookie with the attribute flag set as false are processed regardless of the requests being received without the CSRF token. The subsequent requests including the cookie with the attribute flag set as false may be received from the client device not susceptible to CSRF attacks.

The techniques described herein improve the functioning of API management architectures. For instance, rather than responding to all requests from client devices including malicious requests (e.g., requests transmitted based on users inadvertently selecting malicious links), large amount of processing may be avoided to help with computing resource overload at the API gateway and/or the authentication service. In addition to reducing processing load, each of the API gateway and the authentication service may have specialized, unique tools or resources that enable more effective and efficient security analysis of the requests. As a specific example, the API gateway may have specialized tools for routing requests received from client devices, and the API gateway and/or the authentication service may have specialized tools for performing security analysis on the requests.

Additionally, the techniques described herein not only improve the ability to perform security analysis on API requests, but the techniques also reduce the amount of data that is sent between the multiple computing infrastructures to perform security analysis. For instance, meaningful data may be extracted from a cookie that is probative to whether a request is malicious or not, but private or sensitive information that users may not want to leave the API management infrastructure may not be extracted or transmitted to malicious client devices. By only extracting meaningful data, privacy concerns are addressed, and the amount of data communicated between computing infrastructures is minimized, thereby reducing the amount of bandwidth required. In some instances, one or more servers associated with the API gateway and/or the authentication service may be located in a first jurisdictional region (e.g., country, municipal, union, etc.) and one or more servers associated with the backend service may be located in a second jurisdictional region different than the first jurisdictional region. In some instances, the types of information the requests, or in responses based on the requests, sent across the jurisdictional boundaries may be limited or restricted based on different laws or regulations for those jurisdictions. For instance, various rules or regulations of the different jurisdictions may allow or restrict different data from being communicated in and out to protect privacy concerns. Accordingly, private data in requests or responses may not be allowed to leave the API gateway or the authentication in such examples.

Although the operations for analyzing requests and attribute flags within cookies received along with the requests are described as being performed by an API gateway or the authentication service running in the API management architecture, the techniques may equally be performed by any component, or combination of components, of the API management architecture. That is, the API gateway may route requests from client devices and to the authentication service or other component(s), and route responses, from the authentication service or the other component(s), to the client devices. The API gateway, the authentication service, and/or other devices of the API management architecture, may provide, individually, or in combination, any of the features discussed herein related to CSRF protection.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example application programming interface (API) management architecture 102 that supports cross-site request forgery (CSRF) protection with an attribute flag in a cookie, for client devices that utilize a user session to interface with an API gateway.

Generally, the API management architecture 102 may include devices housed or located in one or more data centers 104 that may be located at different physical locations. For instance, the API management architecture 102 may be supported by networks of devices in a public cloud computing platform, a private/enterprise computing platform, and/or any combination thereof. The one or more data centers 104 may be physical facilities or buildings located across geographic areas and designated to store networked devices that are part of the API management architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth) resources. However, in some examples the devices in the distributed application architecture 102 may not be located in explicitly defined data centers 104 but may be located in other locations or buildings.

The API management architecture 102 may be accessible to one or more client devices with browsers ("client device(s)") 106 and one or more client devices without browsers ("client device(s)") 108 over one or more networks 110, such as the Internet. The API management architecture 102, and the network(s) 110, may each respectively include one or more networks implemented by any viable communication technology, such as wired and/or wireless modalities and/or technologies. The API management architecture 102 and network(s) 110 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The API management architecture 102 may include devices, virtual resources, or other nodes that relay packets from one network segment to another by nodes in the computer network.

In some examples, the API management architecture 102 may provide, host, or otherwise support one or more application services for the client device(s) 106 and/or the client device(s) 108 to connect to and use. The client device(s) 106 and the client device(s) 108 may comprise any type of device configured to communicate using various communication protocols (e.g., MCTCP, QUIC, and/or any other protocol) over the network(s) 110. For instance, any of the client device(s) 106 may comprise a personal user device (e.g., desktop computers, laptop computers, phones, tablets, wearable devices, entertainment devices such as televisions, etc.). For instance, any of the client device(s) 108 may comprise a network device (e.g., servers, routers, switches, access points, etc.). Although the application service(s) for the client device(s) 106 and the client device(s) 108 may be supported as discussed above by the API management architecture 102, this disclosure is not limited as such and application service(s) for any other type of computing device may be supported by the API management architecture 102.

The application services may be distributed applications such that groups of backend servers ("servers") 116 are configured to scale up or down to support instances of an application 118 to service client requests based on demand from the client device(s) 106 or the client device(s) 108. In some examples, the physical servers 116 may each have their own physical IP (PIP) address through which they are reachable, but a client device need only know the virtual IP (VIP) address for the application service as a whole in order to access an instance of an application 118 hosted on the servers 116. In this way, any of the client device(s) 106 or the client device(s) 108 need only know a single VIP to access an application service, and the request to use the application service will be routed to one of the hosted applications 118 on one of the servers 116.

In some examples, the API management architecture 102 may include one or more API gateways (e.g., an API gateway) 110, which may route messages (e.g., requests and responses). For instance, the API gateway 110 may be an API management tool for routing messages between the client device(s) 106 or the client device(s) 108, and backend services (e.g., the server(s) 116). The API gateway 110 may act as a reverse proxy to accept all API calls (e.g., messages), aggregate various services required to fulfill the API calls, and return an appropriate result. The API gateway 110 may handle common tasks that are used across a system of API services, such as user authentication, rate limiting, and statistics. The API Gateway 110 may perform gateway authentication to safeguard the client device(s) 106 and the client device(s) 108 against unwanted access, data breaches, hacks, and mistakes.

The API gateway 110 may receive one or more session requests (e.g., a session request) from, and manage authentication/authorization (e.g., API authentication) for, one of the client device(s) (e.g., a client device) 106 or one of the client device(s) (e.g., a client device) 108. By way of example, the API gateway 110 may manage the authentication/authorization by performing authentication/authorization tasks or delegating the authentication/authorization tasks to one or more authentication servers (e.g., an authentication server) 114 and/or any third-party solution. The API authentication may enable the client device 106 or the client device 108 to access services with a preassigned username and password, or with any other type of authentication framework (e.g., API key authentication, lightweight directory access protocol (LDAP) authentication, OAuth 2.0 authentication, OpenID Connect authentication, etc.).

The API gateway 110 may create a script for a session (e.g., a new session) and generate a JavaScript Object Notation (JSON) web token (JWT), as a cookie, for the session. The cookie may allow the API gateway 110 to transmit data as a JSON object to the client device 106 or the client device 108. The cookie may be digitally signed, based on the API gateway 110 receiving the username and password. Although the cookie may the JWT as discussed in this disclosure, it is not limited as such and any token of any type may be generated as the cookie.

The cookie may be utilized to identify the client device 106 or the client device 108, from which the session request is received. The servers 116 may store, and provide access to, website data based on the cookie. The cookie may include unique identification information associated with the client device 106 or the client device. The identification information in the cookie may utilized by a web browser or an application for obtaining services associated with one or more future request(s). The future request(s) may be associated with the same session or a different session.

The API gateway 110 may generate a value of an attribute flag (e.g., an indicator) in the cookie (e.g., insert the attribute flag in the cookie). The attribute flag may be set based on a header within the session request. The header may include an indicator (e.g., a CSRF indicator) associated with CSRF protection, and may be received as part of the session request, along with the username and password. The API gateway 110 may determine whether the CSRF indicator is included in the header. In some examples, the API gateway 110 may determine whether the CSRF indicator is set to true. The CSRF indicator being included in the header and/or set to have a value of true may be interpreted by the API gateway 110 as indicating that CSRF protection is required. The attribute flag in the cookie may be set as true based on the CSRF indicator being included in the header and/or the value of the CSRF indicator in the header being true. The attribute flag in the cookie may be set as false based on no CSRF indicator being included in the header or the CSRF indicator being included in the header and set as false.

The API gateway 110 may determine whether the session request is received from the client device 106 or the client device 108, based on the CSRF indicator. The API gateway 110 may determine, based on the CSRF indicator being in the header and/or set as true (e.g., the request being received from the client device 106), that CSRF protection is required. The CSRF protection being necessary may be associated with the client device 106 being a user device executing a browser that initiated the request. The requirement for the determination that the CSRF protection is necessary may be further based on the browser being susceptible to CSRF attacks. By instituting CSRF protection, the API gateway 110 prevents a web security vulnerability of the browser. The CSRF protection prevents attacks that circumvent a same origin policy of a website that is designed to prevent the website and a different website from interfering with each other. For example, the CSRF protection prevents an attacker from inducing a user of the browser to perform actions creating an avenue for attack that is unbeknownst or undesirable to the user, such as the user being deceived into changing an email address on the user's account, changing a password, disclosing private information, making a funds transfer, etc.

The API gateway 110 may determine, based on the header not including any CSRF indicator or the CSRF indicator being in the header and set as false (e.g., the request being received from the client device 108), that no CSRF protection is required. The CSRF protection not being necessary may associated with the client device 106 being a network device that is not susceptible to CSRF attacks. The API gateway 110 may, based on determining that CSRF protection is required, create a unique, secret, unpredictable value, as a token (e.g., a CSRF token). The CSRF token may be generated as an internal secret (e.g., an encryption key) with which the session is hashed. An encryption key (e.g., a cryptographic key) may be a string of data used to alter messages associated with the session so that the messages become encrypted. The encrypted messages include data from the initial message that appears to be randomized or scrambled. The API gateway 110 may generate, via an application (e.g., a server-side application) executed by the API gateway 110, the CSRF token. The CSRF token may provide a means for the API gateway 110 to differentiate between authentic requests received from the client device 106 based on authentic links (e.g., authentic links in the browser of the client device 106), and malicious requests received from the client device 106 based on the user inadvertently selecting malicious links (e.g., malicious links in the browser of the client device 106). The CSRF token may be utilized for CSRF protection associated with subsequent requests (e.g., HTTP requests) received by the API gateway 110. The CSRF token may contain significant entropy, be strongly unpredictable, and have the same properties as a session token (e.g., a sessionID). The CSRF token may be generated by utilizing a cryptographic strength pseudo-random number generator (PRNG), seeded with a timestamp and a static secret, the timestamp being associated with a time at which the CSRF token is generated.

At "1," the authentication servers 114 may transmit a request packet 120 based on the service request. In some examples, the service request is received, as the request packet 120, and routed by the API gateway 112 to the authentication server 114, which routes the request packet 120 to the server 116. The API gateway 112 may establish the session by choosing a set of connection IDs that belong to it for this connection. The session may be hashed with the internal secret, utilized to generate a secret value as the CSRF token. The session may be CSRF protected via a requirement for the CSRF token being indicated by the attribute flag in the cookie. Although the session may generated by the session being hashed with the internal secret as discussed in this disclosure, it is not limited as such and the session may be generated without the internal secret and without the session being hashed with the internal secret. By way of example, the session may be generated without the session being hashed with the internal secret, based on the session being generated and on session data being stored by the API gateway 112. An amount of the session data stored for the session being hashed with the internal secret may be less than an amount of the session data stored for the session not being hashed with the internal secret. The session that is generated based on the session being hashed with the internal secret may be more scalable than the session being generated based on the session not being hashed with the internal secret.

The API gateway 110 may transmit one or more session responses (e.g., a session response). The session response may be transmitted based on one of the session request(s). The session response may be transmitted based on determining whether the session has been successfully established. The session response may indicate that the session has been, or has not been, successfully established. In some examples, the session response may be transmitted along with the cookie and accompanied by the CSRF token, based on determining the session request associated with the session response was received from the client device 106. The cookie may be included in a header or a body of the session response. The cookie may include the attribute flag alongside one or more credentials associated with the client device 106. The session response may be received by the client device 106. The session response may be analyzed by the client device 106, which may extract and utilize the cookie and the CSRF token for subsequent requests. In other examples, the session response may be transmitted along with the cookie, but not accompanied by any CSRF token, based on determining the session request associated with the session response was received from the client device 108. The cookie may include the attribute flag alongside one or more credentials associated with the client device 108). The session response may be received by the client device 108, via the authentication server 114 and/or the API gateway 112. The session response may be analyzed by the client device 108, which may extract and utilize the cookie for subsequent requests.

At "2," a transport protocol handshake takes place, and the connection is established and goes on between the client device (e.g., the client device 106 or the client device 108) and the server 116. The session response may be transmitted, as an acknowledge packet 122, from the server 116 and to the client device (e.g., the client device 106 or the client device 108), based on the session being established. After a period of time since the transport protocol handshake, the client device (e.g., the client device 106 or the client device 108) may determine at "3" to use a new source endpoint to send a new data packet (e.g., an address packet) 124. The receiving server 116 may decode the packet, check the connection IDs, and determine that the connection ID(s) belong to another server. At "4," the server 116 may determine the server that was originally in the transport protocol connection based on the mapping from connection IDs to servers 116. The incorrect server 116 may then encapsulate and forward the forwarded data, utilizing a port packet 126, to the correct server 116. The session response may be transmitted, as the acknowledge packet 122, from the correct server 116 and to the client device (e.g., the client device 106 or the client device 108), based on the session being established with the correct server 116.

The API gateway 110 (e.g., the server-side application) may receive a subsequent request and determine whether the request must include the CSRF token, based on the attribute flag. The attribute flag may be included in a header or a body of the subsequent request (e.g., an operation request) to indicate a requirement for the CSRF token. The API gateway 110 may determine whether the CSRF token accompanies the request and validate the CSRF token, based on the attribute flag being true. The API gateway 110 may execute one or more services associated, and/or indicated by, the service request. The API gateway 110 may perform an operation (e.g., a first operation) to execute the service(s) based on determining that the attribute flag is set to true, that the CSRF token is included in the subsequent request, and that the CSRF token is authentic. The API gateway 110 may require the CSRF token to accompany the subsequent request (e.g., be present in, and/or received along with, the subsequent request) based on the attribute flag being true, for the API gateway 110 to allow one or more services associated with the subsequent request to be performed (e.g., performed by the server(s) 116). The API gateway 110 may perform an operation (e.g., a second operation) to deny, and/or refuse to execute, services for malicious requests (e.g., requests inadvertently transmitted by client devices 106 based on links (e.g., malicious links) being selected by users of the client devices 106). In some examples, the second operation may include refusing to execute services, and/or sending a message to the client device 106, indicating a malicious request was received. In some examples, the API gateway 110 may reject the service request based on determining that the attribute flag is set to true and that the CSRF token is missing (e.g., no CSRF token is received) or invalid (e.g., an invalid CSRF token is received). The attribute flag may be utilized by the API gateway 110 to prevent CSRF attacks by making it impossible for an attacker to construct a malicious request with an invalid CSRF token, or with no CSRF token, that would otherwise be processed. Since the attacker cannot determine or predict the value of the CSRF token, they cannot construct a request with all the parameters that are necessary for the API gateway 110 to honor the request.

The API gateway 110 may omit determining whether the CSRF token accompanies the request and whether the CSRF token is authentic, based on the attribute flag being false. The attribute flag being set as false may be associated with the subsequent request being received from the client device 108. The subsequent request may be received from the client device without any CSRF token. The API gateway 110 may route the subsequent request and/or control/allow API services to be executed, notwithstanding the request being received without any CSRF token.

A response (e.g., a service response) may be transmitted based on any of the service request(s). The service response may indicate whether a service associated with the service request was successfully or not successfully executed. In some examples, the API gateway 110 may transmit the service response along with the cookie in a header or a body of the service response, and accompanied by the CSRF token, based on determining the service request associated with the service response was received from the client device 106. The cookie may include the attribute flag alongside one or more credentials associated with the client device 106. The service response may indicate whether validation of the CSRF token was successful, and/or whether there were no errors in executing the service. In a case of successful validation of the CSRF token, but an error occurring in executing the service, the service response may provide information indicating a cause of the error (e.g., a problem with information provided in the request, a problem with computing devices utilized to execute the service, a problem in transmission of data utilized for execution of the service, etc.). The service response may be received by the client device 106. The service response may be analyzed by the client device 106, which may extract and utilize the cookie and the CSRF token for subsequent requests.

In some examples, the API gateway 110 may transmit the service response along with the cookie in a header or a body of the service response, but not accompanied by any CSRF token, based on determining the service request associated with the service response was received from the client device 108. The cookie may include the attribute flag set as false. The attribute flag may be included alongside one or more credentials associated with the client device 108). The service response may be received by the client device 108, via the authentication server 114 and/or the API gateway 112. The service response may be analyzed by the client device 108, which may extract and utilize the cookie for subsequent requests. The service response may provide information indicating whether an error occurred, and, in a case of an error occurring, a cause of the error (e.g., a problem with information provided in the request, a problem with computing devices utilized to execute the service, a problem in transmission of data utilized for execution of the service, etc.).

Although the requests and responses may be managed, as discussed above, by the API gateway 110, this disclosure is not limited as such and any other type of computing device (e.g., one of the authentication server(s) 114) may manage any of the requests and responses by performing any of the various functions discussed above (e.g., any of the functions associated with processing messages by utilizing the CSRF indicator, the cookie, the CSRF token, etc.). For example, one of the authentication server(s) 114, instead of the API gateway 110, may receive the session request, transmit the session response, receive the service request, and transmit the service response. The requests and responses may be routed to and from the authentication server by the API gateway, based on the requests and responses being managed by the authentication server.

The above-noted example is merely illustrative, and various changes made be made to achieve similar or the same results. For instance, rather than using XX such as XX, in an XX environment, the techniques can similarly be performed using XX.

Figure 2:
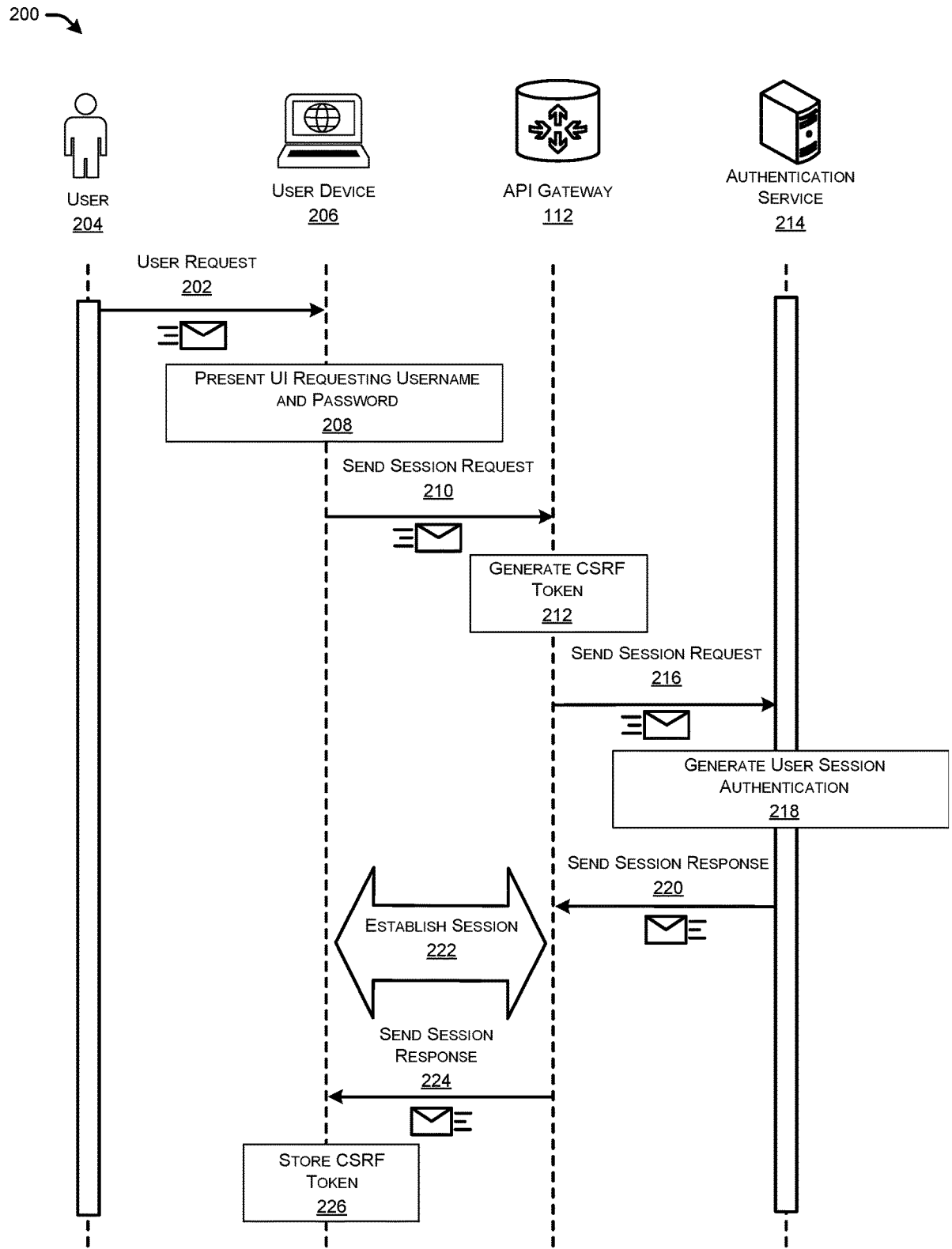
FIG. 2 illustrates a flow diagram of an example API management architecture for establishing a session for a user device with CSRF protection including an attribute flag in a cookie.

FIG. 2 illustrates a flow diagram 200 of an example API management architecture for establishing a session for a user device with CSRF protection including an attribute flag in a cookie.

At 202, a user 204 may provide a user request to a user device 206. The user request may be received based on input to a user interface (UI) of the user device 206. The user request may be associated with a browser executed on the user device 206. The user device 206 may be implemented as the client device 106 illustrated in FIG. 1.

At 208, after processing the user request 202, the user device 206 may present the UI requesting a username and a password. The username and the password may be requested based on the user request 202 being of a type requiring unique identification information from the user 204.

At 210, the user device 206 may send a session request (e.g., an authentication request) to the API gateway 112. The session request may include a header with an indicator (e.g., a CSRF indicator) associated with CSRF protection. The header may be transmitted as part of the session request, along with the username and the password. The session request may be transmitted by the user device 206 (e.g., the browser of the user device 206), based on a link (e.g., an authentic or valid link) being selected by the user of the user device 206. In some examples, the authentic link may be selected in the browser.

At 212, the API gateway 110 may determine whether the CSRF indicator is included in the header and/or is set to true. The CSRF indicator being in the header and/or being set to have a value of true may be interpreted by the API gateway 110 as indicating that CSRF protection is required. The API gateway 110 may generate a cookie including an attribute flag (e.g., insert the attribute flag in the cookie), based on the API gateway 110 determining the cookie is to be generated by the API gateway 110. The API gateway 110 may set a value of the attribute flag in the cookie as true. The value of the attribute flag may be set as true based on the CSRF indicator being in the header and/or indicating that CSRF protection is required. The CSRF indicator may indicated that the CSRF protection is required, based on the CSRF indicator being in the header and/or set as true. The API gateway 110 may, based on determining that CSRF protection is required, create a unique, secret, unpredictable value, as a token (e.g., CSRF token). The value of the attribute flag and the CSRF token may be generated, optionally, by the API gateway 110 or by another device (e.g., a server (e.g., one of the authentication server(s) 114) in an authentication service 214).

At 216, the API gateway 110 may route the session request to the authentication service 214 (e.g., a server (e.g., an authentication server 114) in the authentication service 214), based on the API gateway 110 determining the cookie is to be generated by the authentication service 214. The session request may be transmitted to the authentication service 214 and may include, in the header, the CSRF indicator set as true. The session request may further include the username and the password. In some examples, the session request may be transmitted to the authentication service 214 based on the API gateway 110 determining to route the session request received from the user device 206, instead of to generate the CSRF token 212 and/or the cookie. The API gateway 110 may determine whether to route the session request or to generate the CSRF token 212 and the cookie, based on any of a variety of factors, such as a workload level of the API gateway 110, a workload level of the authentication server 114, a threshold associated with a number of CSRF tokens and/or a threshold associated with a number of cookies being generated by the API gateway 110 during a period of time being exceeded, etc.

At 218, the authentication service 214 may generate (e.g., perform) a user session authentication. The authentication service 214, as part of generating the user session authentication, may generate the attribute flag in the cookie and set the value of the attribute flag. The authentication service 214 may set the attribute flag to true, based on the CSRF indicator in the session request received from the API gateway 110 being set as true. In some examples, the authentication service 214 may generate the CSRF token instead of the API gateway 110. In those examples, the authentication service 214 may generate the CSRF token similarly as described above for the API gateway 110. The user session authentication being generated by the authentication service 214 that also generates the CSRF token may be based on the API gateway 112 transmitting the session request 216, but not generating the CSRF token.

At 220, the authentication service 214 may transmit a session response (e.g., authentication response). The session response may be transmitted further based on at least one of the session response being received from the API gateway 112, the cookie being generated with the attribute flag, the value of the attribute flag being set, or the CSRF token being generated. In some examples, the session response may be transmitted further based on all of the cookie being generated with the attribute flag, the value of the attribute flag being set, and the CSRF token being generated. The session response may be transmitted along with the cookie, and accompanied by the CSRF token that was generated by the API gateway 112 or the authentication service 214. The cookie may include the attribute flag alongside one or more credentials (e.g., the username and/or the password) associated with the user device 206. The attribute flag in the response may be set as true, based on the attribute flag in the session request being set as true.

At 222, the API gateway 110 may generate a session (e.g., user session). The API gateway 110 may establish the session by choosing a set of connection IDs that belong to it for this connection. The session may be established with CSRF protection based on the attribute flag being set by the API gateway 110 as true, or on the attribute flag in the session request received from the authentication server 114 being set as true.

At 224, the API gateway 110 may route, to the user device 206, the session response received from the authentication service 214. The session response may be transmitted to the authentication service 214 and may include the cookie with the attribute flag being set as true, and further include the CSRF token. The cookie may be included in a header of the session response or a body of the session response. The cookie may include the attribute flag alongside the one or more credentials. The session response may be transmitted based on the CSRF token and/or the cookie having been generated by the API gateway 110, or on the API gateway 110 receiving the session response from the authentication service 214.

At 226, the user device 206 may store the CSRF token and the cookie. The CSRF token may be stored locally in the user device 206. The CSRF token and the cookie may be used by the user device 206 for subsequent requests (e.g., service requests) transmitted for the session and/or a different session. The user device 206 may transmit the CSRF token and the cookie in the subsequent requests based on the user device 206 requiring CSRF protection. The subsequent requests may be processed only if the CSRF token is included, based on the attribute flag being set as true, in order to prevent any subsequent requests from being processed based on inadvertent selection of malicious links by the user of the user device 206.

Figure 3:
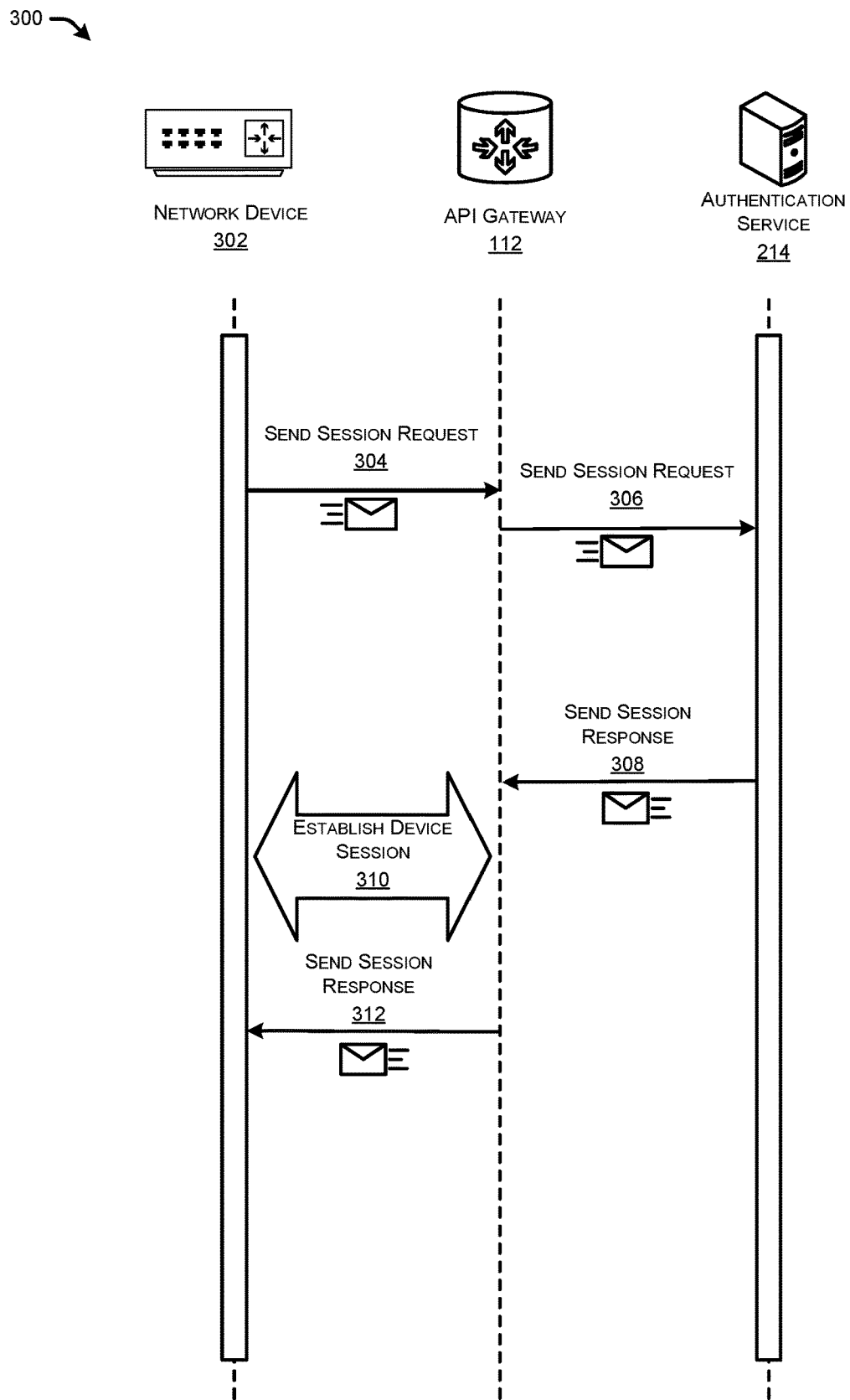
FIG. 3 illustrates a flow diagram of an example API management architecture 300 for establishing a session for a network device without requiring an attribute flag in a cookie.

FIG. 3 illustrates a flow diagram of an example API management architecture 300 for establishing a session for a network device without requiring an attribute flag in a cookie.

At 304, a network device 302 may send a session request to the API gateway 112. The session request may include a header without the CSRF indicator, or with an indicator indicating that no CSRF protection being required. The indicator may be set as false to indicate that no CSRF protection is required. The CSRF indicator may be omitted from the header of the session request, or may be set as false, based on the network device 306 not being susceptible to CSRF attacks. That is, the network device 306 not being susceptible to the CSRF attacks based on the network device 306 not including a browser may transmit the session request without the CSRF indicator. The header may be transmitted as part of the session request, with the username and the password associated with the client device 302. The session request may be transmitted based on the device request received from the client device 302.

At 306, the API gateway 110 may generate a cookie or route the session request to the authentication service 214 (e.g., a server (e.g., an authentication server 114) in the authentication service 214). The API gateway 110 may generate the cookie, based on the API gateway 110 determining the cookie is to be generated by the API gateway 110. The cookie may be generated with an attribute flag set to false. The attribute flag may be set to false based on the session request omitting the CSRF indicator, or on the session request including the indicator associated with no CSRF protection being required. The session request may be transmitted to the authentication service 214, based on the API gateway 110 determining the cookie is to be generated by the authentication service 214. The session request transmitted to the authentication service 214 may include the header with no indicator. The session request transmitted to the authentication service 214 may further include the username and the password. The API gateway 110 may determine whether to route the session request or to generate the cookie based on any of a variety of factors, such as a workload level of the API gateway 110, a workload level of the authentication server 114, a threshold associated with a number of cookies being generated by the API gateway 110 during a period of time being exceeded, etc.

At 308, the authentication service 214 may transmit a session response (e.g., an authentication response). The session response may be transmitted further based on at least one of the session response being received from the API gateway 112, the cookie being generated without the attribute flag, or the value of the attribute flag being set. In some examples, the session response may be transmitted further based on all of the session response being received from the API gateway 112, the cookie being generated with the attribute flag, and the value of the attribute flag being set. The session response may be transmitted along with the cookie but without being accompanied by any CSRF token. The cookie may include the attribute flag alongside one or more credentials (e.g., the username and/or the password) associated with the user device 206. The attribute flag may be set to false, based on the attribute flag in the session request being set as false.

At 310, the API gateway 110 may generate a session (e.g., device session). The API gateway 110 may establish the session by choosing a set of connection IDs that belong to it for this connection. The session may be established without CSRF protection based on the attribute flag being set by the API gateway 110 as false, or on the attribute flag in the session response received from the authentication server 114 being set as false.

At 312, the API gateway 110 may route, to the network device 306, the session response received from the authentication service 214. The session response may be transmitted to the network device 306 and may include the cookie with the attribute flag being set as false, and without including any CSRF token. The cookie may be included in a header of the session response or a body of the session response. The cookie may include the attribute flag alongside the one or more credentials. The session response may be transmitted to the network device, based on the cookie having been generated by the API gateway 110, or on the API gateway 110 receiving the session response from the authentication service 214

Figure 4:
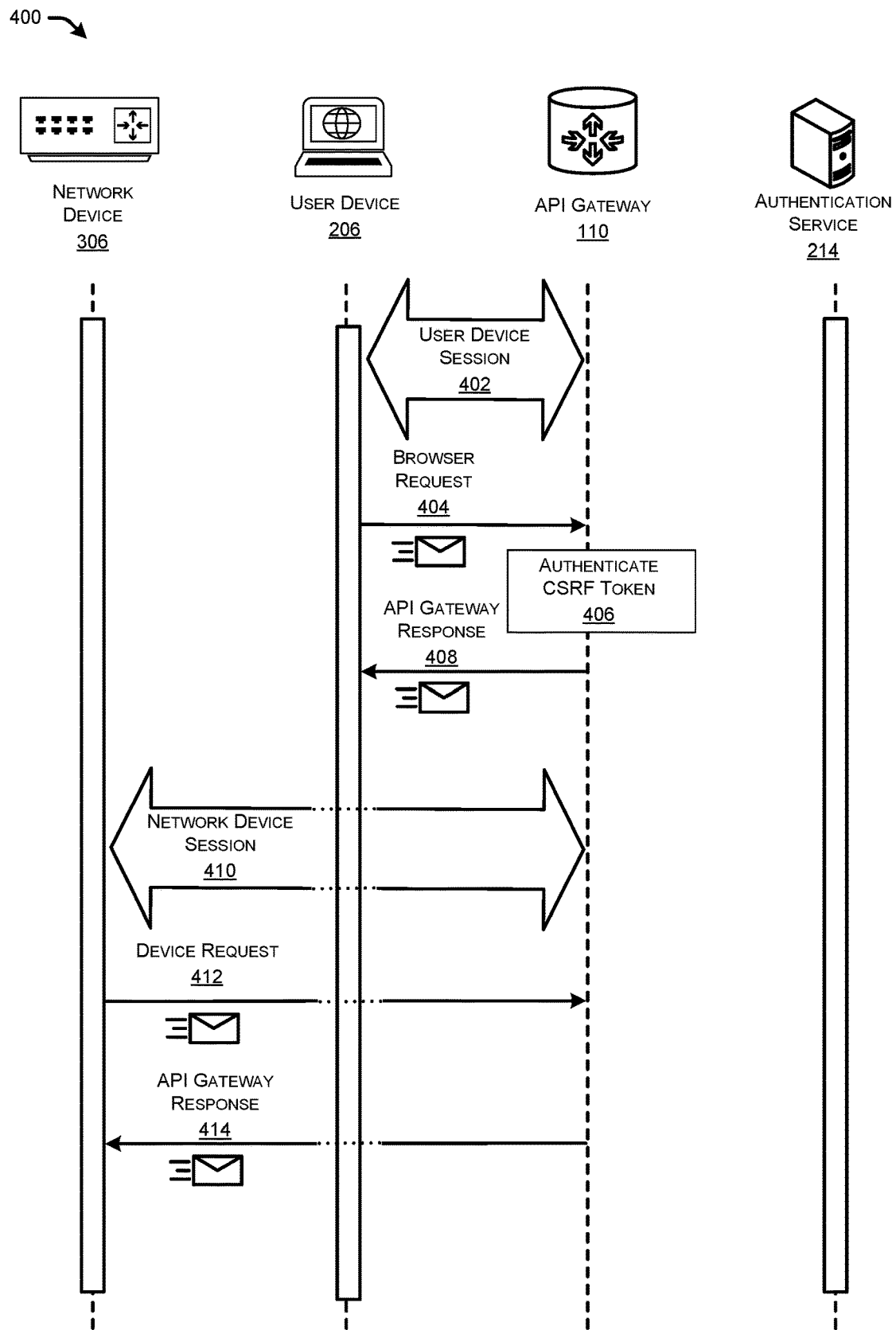
FIG. 4 illustrates a flow diagram of an example API management architecture that supports CSRF protection with an attribute flag in a cookie, for API gateways supporting services for requests received from client devices.

FIG. 4 illustrates a flow diagram 400 of an example API management architecture that supports CSRF protection with an attribute flag in a cookie, for API gateways supporting services for requests received from client devices.

At 402, the session (e.g., a user device session) between the user device 206 and the API gateway 110 may be maintained, based on the session being established by the API gateway 110 at 222 as illustrated in FIG. 2. The session being maintained between the user device 206 and the API gateway 110 may enable the user device 206 to request API services. The user device 206 may request API services by sending one or more service requests to the API gateway.

At 404, the user device 206 may send a service request to the API gateway 112. The service request may be transmitted along with the cookie and accompanied by the CSRF token. The cookie may include the attribute flag alongside one or more credentials (e.g., the username and/or the password) associated with the user device 206. The attribute flag may be set as true, based on the session response being received from the API gateway 112 with the attribute flag set as true, at 224 as illustrated in FIG. 2.

At 406, the API gateway 110 may determine whether the CSRF token accompanies the request and validate the CSRF token, based on the attribute flag being true. The API gateway 110 may control and/or allow execution of one or more services associated, and/or indicated by, the service request. The API gateway 110 may control and/or allow execution of the service(s) based on determining that the attribute flag is set to true, that the CSRF token is included in the subsequent request, and that the CSRF token is authentic.

At 408, the API gateway 110 may transmit a service response (e.g., API gateway response) to the user device 206. The service response may include the cookie with the attribute flag being set as true, and further include the CSRF token. The cookie may be included in a header of the service response or a body of the service response. The cookie may include the attribute flag alongside the one or more credentials. The service response may be transmitted with the attribute flag being set as true, and further include the CSRF token, based on the API gateway 110 receiving, from the user device 206, the service request with the attribute flag being set as true, and further include the CSRF token.

At 410, the session (e.g., a network device session) between the network device 306 and the API gateway 110 may be maintained, based on the session being established by the API gateway 110 at 310 as illustrated in FIG. 3. The session being maintained between the network device 306 and the API gateway 110 may enable the network device 306 to request API services. The network device 306 may request API services by sending one or more service requests to the API gateway. The network device session may be established at a same time as the user device session or at a different time. A period of time associated with the network device session may overlap in time partially or fully with a period of time associated with the user device session. Any number of user device sessions for corresponding devices and/or any number of network device sessions for corresponding devices may be maintained at any time.

At 412, the network device 306 may send a service request to the API gateway 112. The service request may be transmitted along with the cookie, but without being accompanied by the CSRF token. The cookie may include the attribute flag alongside one or more credentials (e.g., the username and/or the password) associated with the user device 206. The attribute flag may be set as false, based on the session response being received from the API gateway 112 with the attribute flag set as false, at 312 as illustrated in FIG. 3.

At 414, the API gateway 110 may transmit a service response (e.g., API gateway response) to the network device 306. The service response may be transmitted based on the API gateway 112 controlling and/or allowing execution of one or more services associated with the service request received from the network device 306, the service(s) being executed without requiring CSRF protection. The service response may include the cookie with the attribute flag being set as false, and without including the CSRF token. The cookie may be included in a header of the service response or a body of the service response. The cookie may include the attribute flag alongside the one or more credentials. The service response may be transmitted with the attribute flag being set as false, and without the CSRF token, based on the API gateway 110 receiving, from the network device 306, the service request with the attribute flag being set as false, and without any CSRF token accompanying the service request.

Figure 5:
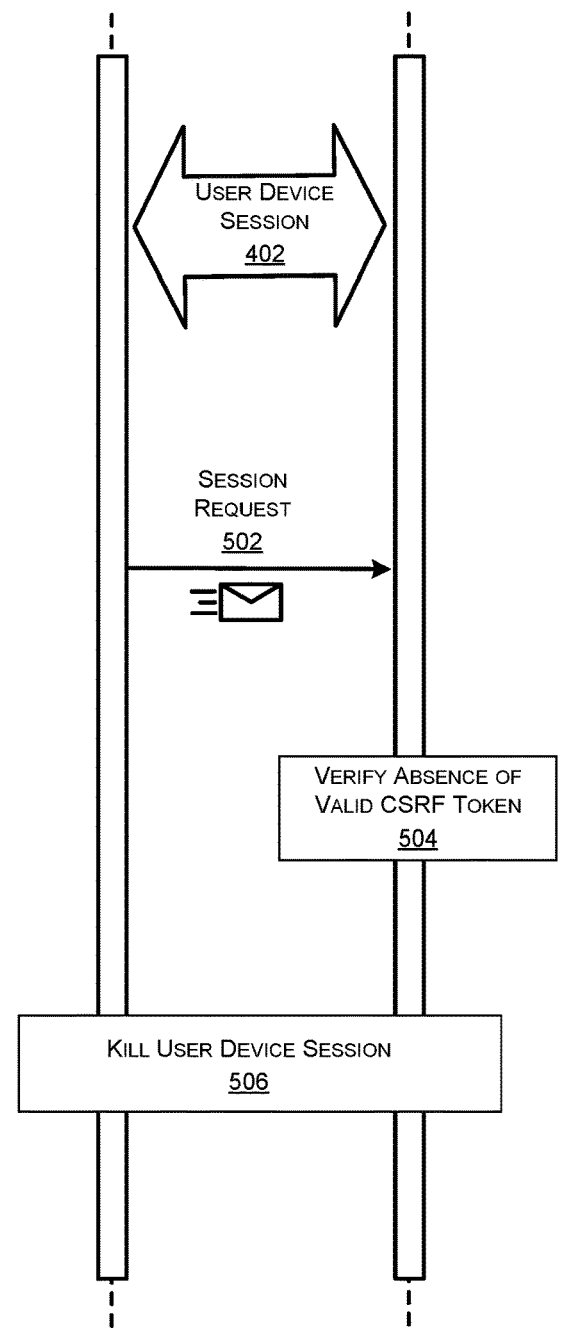
FIG. 5 illustrates a flow diagram of an example API management architecture that supports CSRF protection with an attribute flag in a cookie, for API gateways managing detection of requests based on malicious links and killing user sessions.

FIG. 5 illustrates a flow diagram 500 of an example API management architecture that supports CSRF protection with an attribute flag in a cookie, for API gateways managing detection of requests based on malicious links and killing user sessions.

At 402, the session (e.g., a user device session) between the user device 206 and the API gateway 110 may be maintained, based on the session being established by the API gateway 110 at 222 as illustrated in FIG. 2. The session being maintained between the user device 206 and the API gateway 110 may enable the user device 206 to request API services.

At 502, the user device 206 may send a service request to the API gateway 112. The service request may be a malicious request transmitted along with the cookie, and either accompanied by a different CSRF token (e.g., a CSRF token not matching the initial CSRF token) or without being accompanied by a CSRF token. The service request may be transmitted by the browser of the user device 206, based on a disguised link (e.g., a malicious link) being inadvertently selected by a user of the user device 206. The attribute flag in the cookie may be set as true, based on the session response being received from the API gateway 112 with the attribute flag set as true, at 224 as illustrated in FIG. 2.

At 504, the API gateway 110 may verify an absence of a valid CSRF token. In some examples, the API gateway 110 may determine whether the CSRF token accompanies the request, based on the attribute flag being true. The API gateway 110 may determine to not execute any service based on determining that the attribute flag is set to true, and either that the different CSRF token is included in the subsequent request, or that no CSRF token is included in the subsequent request. The API gateway 110 may deny, and/or refuse (e.g., decline) to execute, services based on determining the subsequent request was received from the user device 206, based on the user inadvertently selecting the malicious link. For example, the API gateway 110 may reject the service request based on determining that the attribute flag is set to true and that the CSRF token is missing or invalid.

At 506, the API gateway 110 may kill the user device session. The API gateway 110 may kill the user device session based on determining the subsequent request was received from the user device 206 without the valid CSRF token. The valid CSRF token may be missing from the session request, based on the disguised link (e.g., the malicious link) being inadvertently selected by the user of the user device 206. The API gateway 110 may refuse to execute the service(s) associated with the session request received from the user device 206, based on the disguised link being inadvertently selected by the user of the user device 206.

Figure 6:
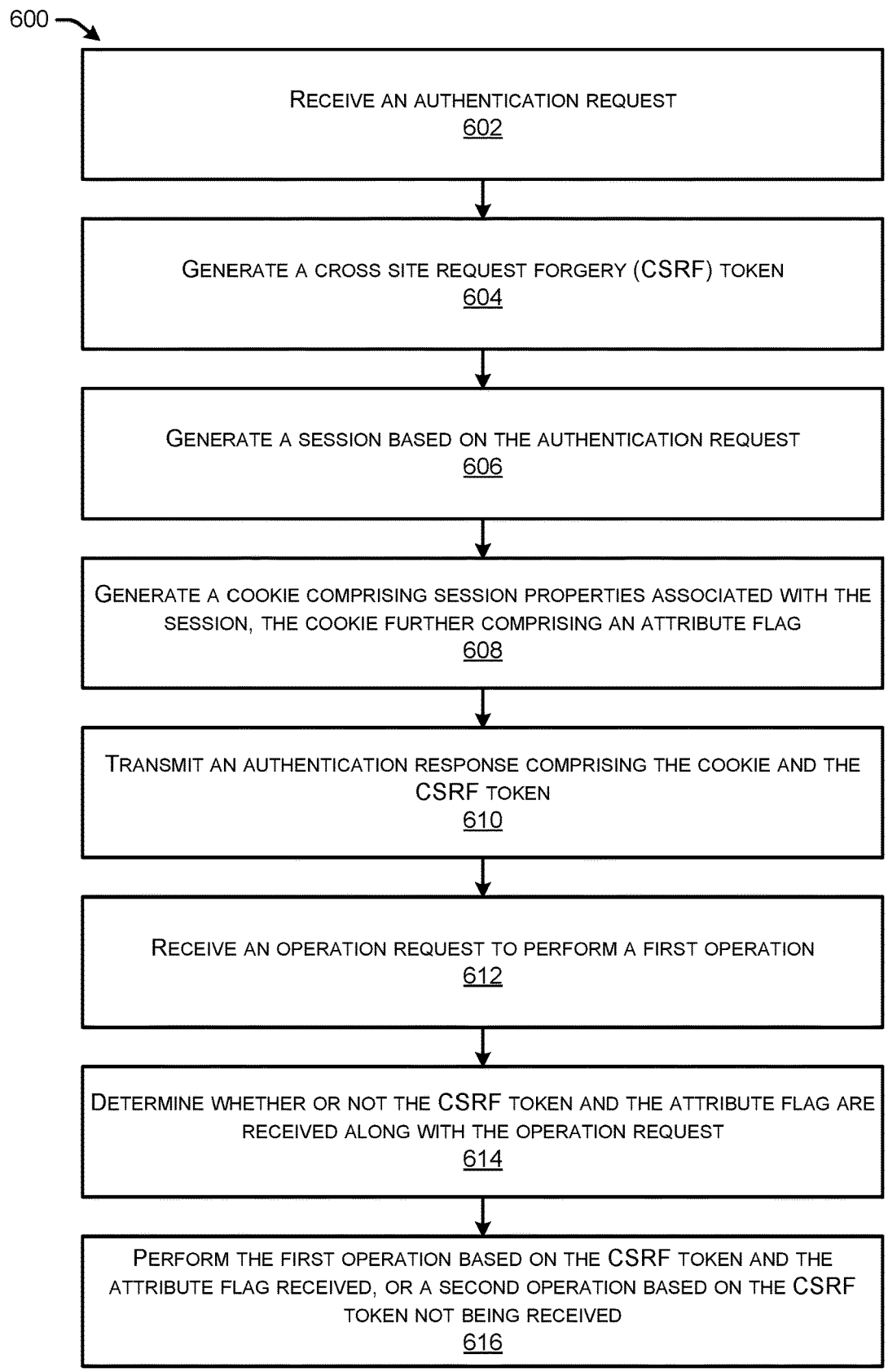
FIG. 6 illustrates a flow diagram of an example API management architecture including an API gateway, the API gateway utilizing CSRF protection with an attribute flag in a cookie to perform authentication of requests received from client devices and execute API services.
Figure 7:
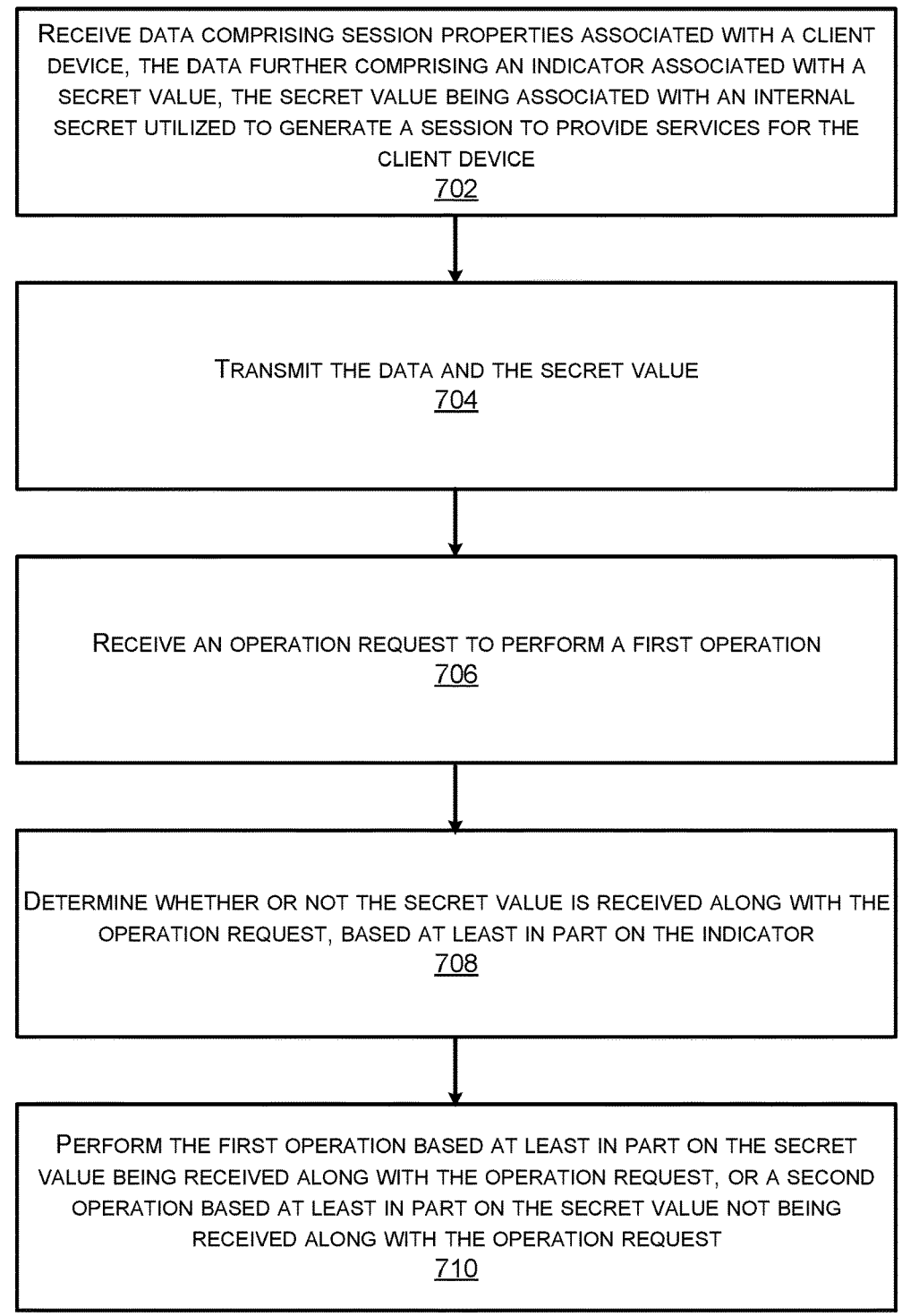
FIG. 7 illustrates a flow diagram of an example method for API gateways utilizing CSRF protection with an attribute flag in a cookie to perform authentication of requests received from client devices and execute API services.
Figure 8:
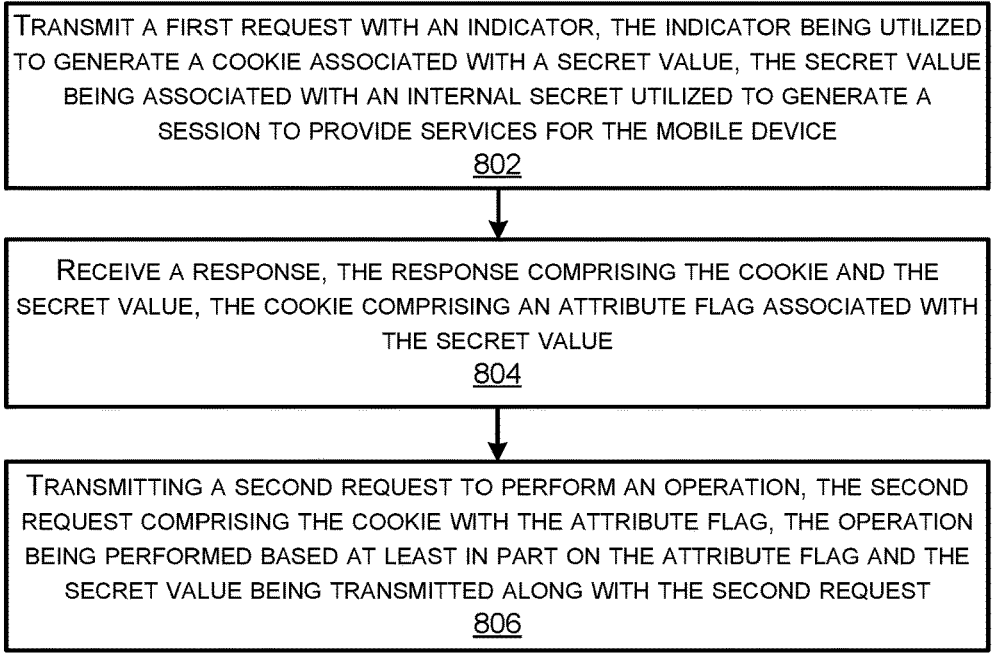
FIG. 8 illustrates a flow diagram of an example method for mobile devices interchanging with API gateways that utilize CSRF protection with an attribute flag in a cookie to perform authentication of requests received from client devices and execute API services.

FIGS. 6-8 illustrate flow diagrams of example methods 600, 700, and 800 that illustrate aspects of the functions performed at least partly by the devices in the API management architecture as described in FIGS. 1-5. The logical operations described herein with respect to FIGS. 6-8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6-8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more FIG. 6 illustrates a flow diagram 600 of an example API management architecture including an API gateway 112, the API gateway utilizing CSRF protection with an attribute flag in a cookie to perform authentication of requests received from client devices and execute API services. In some examples, the API gateway 112 may include, or correspond to, the any type of network device described herein.

At 602, the API gateway 110 may receive an authentication request (e.g., session request). The authentication request may be a session request transmitted by the client device 106. For example, the session request may be received from the client device 106 executing a browser (e.g., a user device). The session request may include a username and a password.

At 604, the API gateway 110 may generate a cross site request forgery (CSRF) token based on an internal secret. The CSRF token may be generated by creating a unique, secret, unpredictable value, as a token. The internal secret may be an encryption key with which a session is hashed. The encryption key (e.g., a cryptographic key) may be a string of data used to alter messages associated with the session so that the messages become encrypted.

At 606, the API gateway 110 may generate a session based on the session request. The session may be generated by creating the session and hashing the session with the internal secret.

At 608, the API gateway 110 may generate a cookie comprising session properties associated with the session. The cookie may include an attribute flag associated with the CSRF token. The cookie may be generated based on the username and the password associated with the client device 106.

At 610, the API gateway 110 may transmit an authentication response (e.g., session response) comprising the cookie and the CSRF token. The session response may indicate that the session has been, or has not been, successfully established. In some examples, the session response may be transmitted along with the cookie and accompanied by the CSRF token, based on determining the session request was received from the client device 106.

At 612, the API gateway 110 may receive an operation request (e.g., subsequent request) to perform a first operation. In some examples, the request may be received along with the cookie and accompanied by the CSRF token, based on the session request being transmitted by the client device 106.

At 614, the API gateway 110 may determine whether or not the CSRF token and the attribute flag are received along with the operation request. The API gateway 110 may require the CSRF token to accompany the subsequent request based on the attribute flag being true.

At 616, the API gateway 110 may perform the first operation based on the CSRF token and the attribute flag received, or a second operation based on the CSRF token not being received. In some examples, the API gateway 110 may perform the first operation based on the CSRF token and the attribute flag being received along with the operation request, and further based on the attribute flag being true. In some examples, the API gateway 110 may perform the second operation based on the CSRF token not being received along with the operation request. The second operation may be performed based on the attribute flag being true, and on the API gateway 110 requiring the CSRF token to accompany the subsequent request.

FIG. 7 illustrates a flow diagram of an example method for API gateways utilizing CSRF protection with an attribute flag in a cookie to perform authentication of requests received from client devices and execute API services.

At 702, an API gateway 110 may receive data including session properties associated with the client device 106. The data may further include an indicator associated with a secret value. The data may be received from the backend server 116. The data may include a cookie generated by the backend server 116. The indicator may be an attribute flag inserted within the cookie. The secret value may be a cross site request forgery (CSRF) token associated with an internal secret utilized to generate a session to provide services for the client device 106.

At 704, the API gateway 110 may transmit the data and the secret value. The data may be a cookie with an attribute flag. The cookie may be transmitted to the client device 106.

At 706, the API gateway 110 may receive a request to perform a first operation. The request may be received from the client device 106.

At 708, the API gateway 110 may determine whether or not the secret value is received along with the operation request, based at least in part on the indicator. The indicator may include the attribute flag inserted within the cookie. The attribute flag may indicate a requirement for the secret value accompanying, as the CSRF token, the request.

At 710, the API gateway 110 may perform the first operation based at least in part on the CSRF token being received along with the operation request, or a second operation based at least in part on the CSRF token not being received along with the operation request. The first operation may be performed based on the CSRF token being received, and further based on the attributer flag being set as true. The attribute flag set as true may be associated with the request being received from a user device with a browser. The second operation may be performed based on no CSRF token being received, and further based on the attributer flag being set as true.

FIG. 8 illustrates a flow diagram of an example method for mobile devices interchanging with API gateways that utilize CSRF protection with an attribute flag in a cookie to perform authentication of requests received from client devices and execute API services.

At 802, a mobile device (e.g., a client device 106) executing a browser may transmit a first request with an indicator, the indicator being utilized to generate a cookie associated with a secret value, the secret value being associated with an internal secret utilized to generate a session to provide services for the mobile device. The secret value may be a cross site request forgery (CSRF) token.

At 804, the mobile device may receive a response (e.g., a session response) that may include the cookie and the secret value. The cookie may include an attribute flag associated with the secret value.

At 806, the mobile device transmitting a second request to perform an operation, the second request comprising the cookie with the attribute flag, the operation being performed based at least in part on the attribute flag and the secret value being transmitted along with the second request. The second request may be utilized by the backend server 116 to perform one or more API services, based on the attribute flag being set as true and on the secret value being included in the second request.

Figure 9:
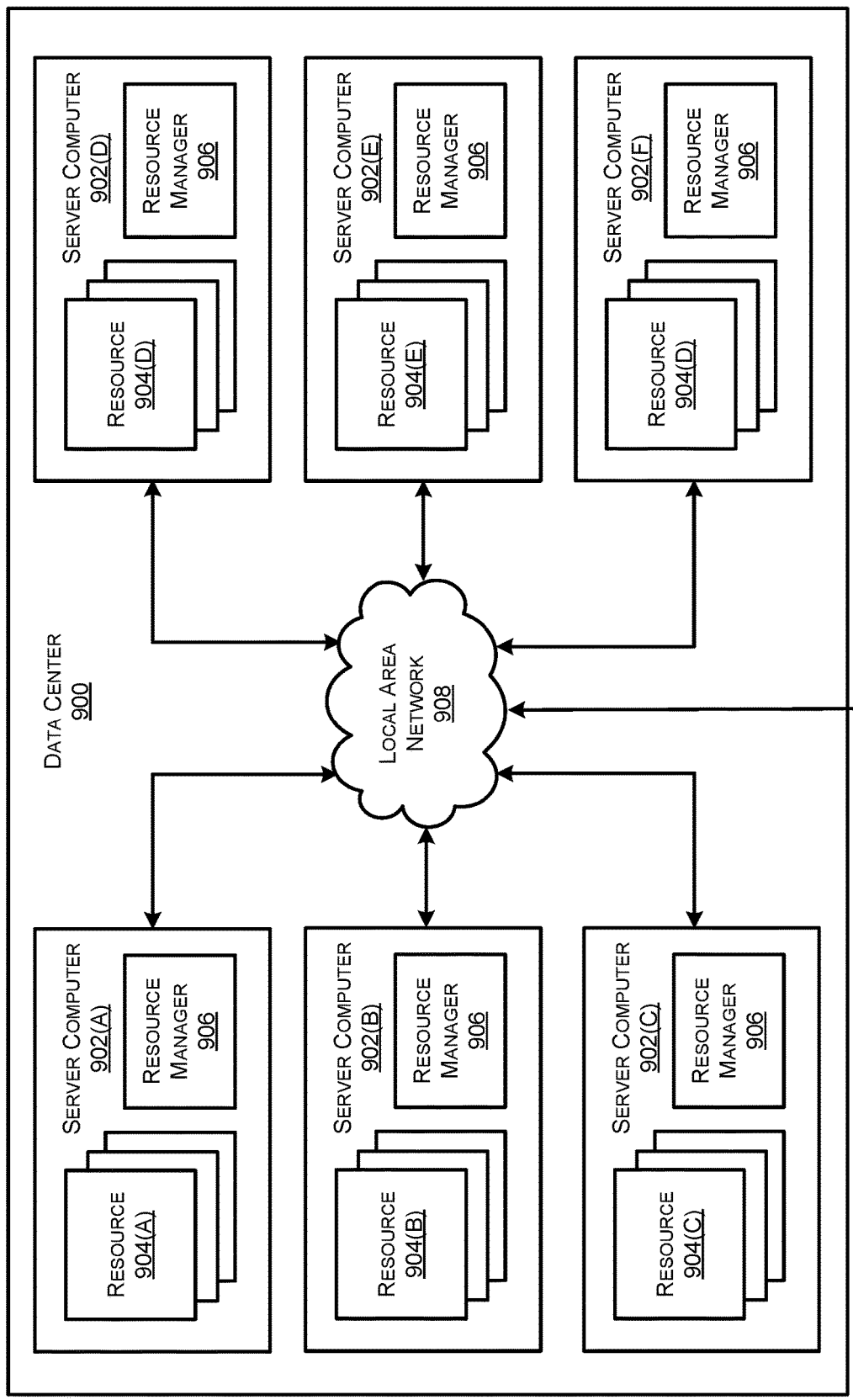
FIG. 9 illustrates a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several server computers 902A-902F (which might be referred to herein singularly as "a server computer 902" or in the plural as "the server computers 902") for providing computing resources. In some examples, the resources and/or server computers 902 may include, or correspond to, the any type of networked device (e.g., network device) described herein. Although described as servers, the server computers 902 may comprise any type of networked device, such as servers, switches, routers, hubs, bridges, gateways, modems, repeaters, access points, etc.

The server computers 902 can be standard tower, rack-mount, or blade server computers configured appropriately for providing computing resources. In some examples, the server computers 902 may provide computing resources 904 including data processing resources such as VM instances or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 900 can also be configured to provide network services and other types of services.

In the example data center 900 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 900, between each of the server computers 902A-902F in each data center 900, and, potentially, between computing resources in each of the server computers 902. It should be appreciated that the configuration of the data center 900 described with reference to FIG. 9 is merely illustrative and that other implementations can be utilized.

In some examples, the server computers 902 may each execute one or more application containers and/or virtual machines to perform techniques described herein.

In some instances, the data center 900 may provide computing resources, like application containers, VM instances, and storage, on a permanent or an as-needed basis. Among other types of functionality, the computing resources provided by a cloud computing network may be utilized to implement the various services and techniques described above. The computing resources 904 provided by the cloud computing network can include various types of computing resources, such as data processing resources like application containers and VM instances, data storage resources, networking resources, data communication resources, network services, and the like.

Each type of computing resource 904 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 904 not mentioned specifically herein.

The computing resources 904 provided by a cloud computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below with regard to FIG. 8.

Figure 10:
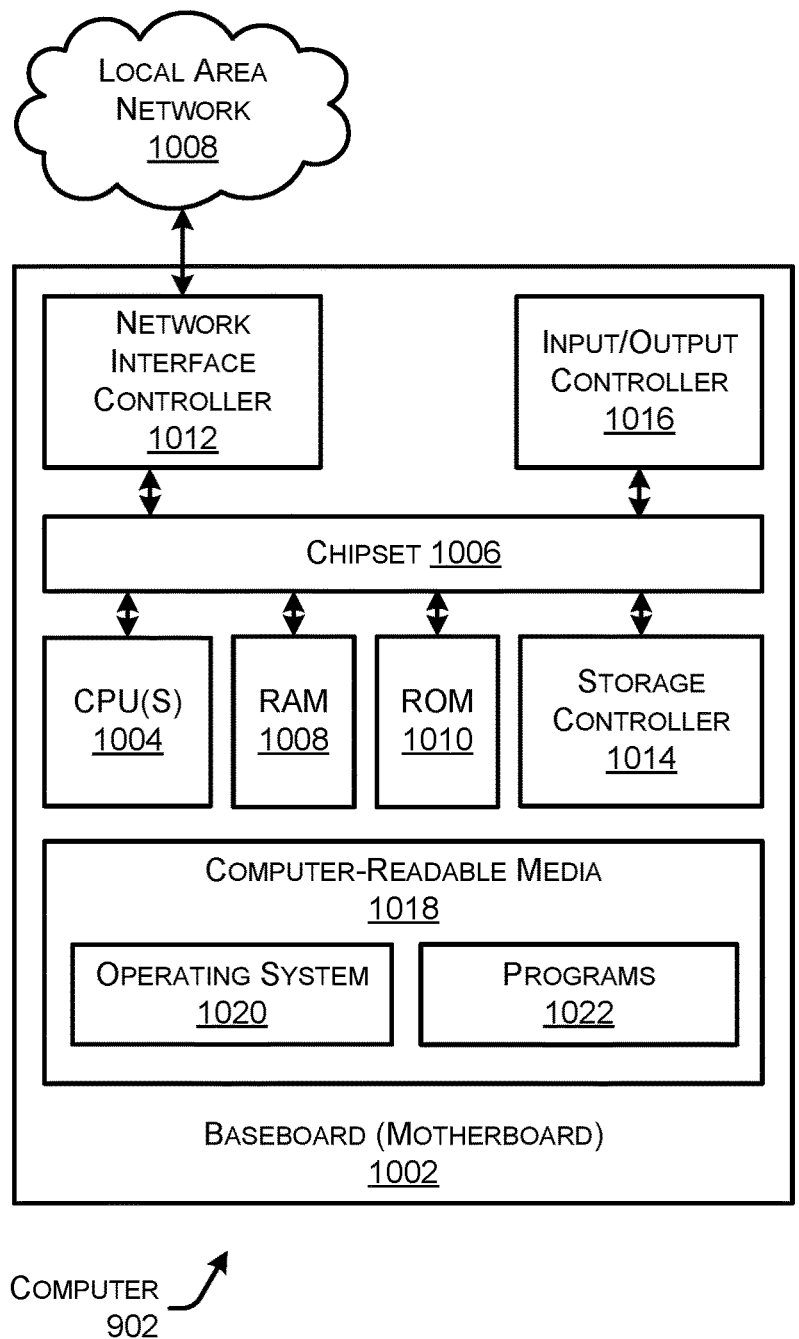
FIG. 10 is a computer architecture diagram showing an illustrative computer hardware architecture for implementing a computing device that can be utilized to implement aspects of the various technologies presented herein.

FIG. 10 shows an example computer architecture for a server computer 1002 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The server computer 902 may, in some examples, correspond to a physical server 116 described herein, and may comprise networked devices such as servers, switches, routers, hubs, bridges, gateways, modems, repeaters, access points, etc.

The computer 902 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 902.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 902. The chipset 1006 can further provide an interface to a computer-readable storage medium such as a read-only memory ("ROM") 1010 or non-volatile RAM ("NVRAM") for storing basic routines that help to startup the computer 902 and to transfer information between the various components and devices. The ROM 1010 or NVRAM can also store other software components necessary for the operation of the computer 902 in accordance with the configurations described herein.

The computer 902 can operate in a networked environment using logical connections to remote computing devices and computer systems through a network, such as the network 908. The chipset 1006 can include functionality for providing network connectivity through a NIC 1012, such as a gigabit Ethernet adapter. The NIC 1012 is capable of connecting the computer 902 to other computing devices over the network 908 (and/or 102). It should be appreciated that multiple NICs 1012 can be present in the computer 902, connecting the computer to other types of networks and remote computer systems.

The computer 902 can be connected to a storage device 1018 that provides non-volatile storage for the computer. The storage device 1018 can store an operating system 1020, programs 1022, and data, which have been described in greater detail herein. The storage device 1018 can be connected to the computer 902 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 902 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 902 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 902 can further read information from the storage device 1018 by detecting the physical states or characteristics of one or more particular locations within the physical storage units.

In addition to the mass storage device 1018 described above, the computer 902 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 902. In some examples, the operations performed by devices in the API management architecture 102, and or any components included therein, may be supported by one or more devices similar to computer 902. Stated otherwise, some or all of the operations performed by the API management architecture 102, and or any components included therein, may be performed by one or more computer devices 1002 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 902. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1018 can store other system or application programs and data utilized by the computer 902.

In one embodiment, the storage device 1018 or other computer-readable storage media is encoded with computer-executable instructions which, when loaded into the computer 902, transform the computer from a general-purpose computing system into a special-purpose computer capable of implementing the embodiments described herein. These computer-executable instructions transform the computer 902 by specifying how the CPUs 1004 transition between states, as described above. According to one embodiment, the computer 902 has access to computer-readable storage media storing computer-executable instructions which, when executed by the computer 902, perform the various processes described above with regard to FIGS. 1-8. The computer 902 can also include computer-readable storage media having instructions stored thereupon for performing any of the other computer-implemented operations described herein.

The computer 902 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 902 might not include all of the components shown in FIG. 10, can include other components that are not explicitly shown in FIG. 10, or might utilize an architecture completely different than that shown in FIG. 10.

As described herein, the computer 902 may comprise one or more of an API gateway 110, an authentication server 114, and/or a server 116. The computer 902 may include one or more hardware processors 1004 (processors) configured to execute one or more stored instructions. The processor(s) 1004 may comprise one or more cores. Further, the computer 902 may include one or more network interfaces configured to provide communications between the computer 902 and other devices, such as the communications described herein as being performed by the API gateway 110, the authentication server 114, and/or the server 116. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure for providing the API management architecture 102 that is capable of supporting multipath transport protocol. That is, the computer 902 may comprise any one of the API gateways 110, the authentication servers 114, and/or the servers 116. The programs 1022 may comprise any type of program that cause the computer 902 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An application program interface (API) management architecture comprising an API gateway, the API gateway comprising:
    one or more processors; and
    one or more non-transitory computer-readable media storing computer-executable instructions that, when executed by the one or more processors, cause the one or more processors to perform operations comprising:
    receiving an authentication request;
    generating a cross site request forgery (CSRF) token;
    generating a session based on the authentication request;
    generating a cookie comprising session properties associated with the session, the cookie further comprising an attribute flag with a value indicating whether or not the cookie needs to be received along with the CSRF token in an operation request;
    transmitting an authentication response comprising the cookie and the CSRF token;
    receiving the operation request to perform a first operation;
    determining whether or not the CSRF token and the attribute flag are received along with the operation request; and
    performing the first operation based on the CSRF token and the attribute flag received along with the operation request, or a second operation based on the CSRF token not being received along with the operation request.

2. The API gateway of claim 1, wherein determining whether or not the attribute flag is received along with the operation request further comprises determining the attribute flag is present in a header of the operation request, further comprising:
    performing the first operation based on the value of the attribute flag, and on the CSRF token being present in the operation request.

3. The API gateway of claim 1, further comprising:
determining the CSRF token is not present in the operation request; and
performing the second operation based on a boolean value being utilized to set the value of the attribute flag, and on the CSRF token not being present in the operation request.

4. The API gateway of claim 1, wherein:
the cookie is implemented as a JavaScript Object Notation (JSON) Web Token (JWT) token; and
the operation request is required to be accompanied by the CSRF token based on the attribute flag, for the API gateway to allow one or more services associated with the operation request.

5. The API gateway of claim 1, wherein:
the authentication request is received based on a user of a client device selecting an authentic link; and
the CSRF token is a first CSRF token, further comprising:
performing the second operation based on determining a second operation request is received from the client device, based on the user of the client device selecting a malicious link, the second operation request determined to be received from a malicious client based on:
the second operation comprising no CSRF token; or
the second operation comprising a second CSRF token that does not match the first CSRF token.

6. The API gateway of claim 1, wherein
the authentication request is received based on a user of a client device selecting an authentic link, further comprising:
performing the second operation based on determining the operation request is received from the client device, based on the user of the client device selecting a malicious link, the second operation comprising not transmitting an operation response to the client device.

7. The API gateway of claim 1, wherein:
the authentication request is received based on a user of a client device selecting an authentic link, further comprising:
performing the first operation based on determining the operation request is received from the client device, the first operation comprising transmitting an operation response to the client device.

8. The API gateway of claim 1, wherein:
a non-random value is utilized to set the value of the attribute flag, and
the attribute flag is different from the CSRF token, and from data that is used to create the CSRF token.

9. A method, for an application program interface (API) gateway, the method comprising:
receiving a cookie comprising session properties associated with a client device, the cookie further comprising an attribute flag with a value indicating whether or not a cross site request forgery (CSRF) token needs to accompany the cookie in an operation request, the CSRF token being associated with an internal secret utilized to generate a session to provide services for the client device;
transmitting the cookie and the CSRF token;
receiving the operation request to perform a first operation;
determining whether or not the CSRF token is received along with the operation request, based at least in part on the attribute flag; and
performing the first operation based at least in part on the CSRF token being received along with the operation request, or a second operation based at least in part on the CSRF token not being received along with the operation request.

10. The method of claim 9, further comprising:
receiving a session request,
wherein:
the session is generated based at least in part on the session request;
the session is hashed with the internal secret utilized to generate a secret value as the CSRF token; and
a requirement for the secret value is indicated by an indicator, the indicator being generated as the attribute flag.

11. The method of claim 10, wherein a secret value is generated as the CSRF token.

12. The method of claim 9, wherein the cookie further comprises session properties associated with the session.

13. The method of claim 9, further comprising:
performing the first operation based at least in part on a non-random value being utilized to set the value of the attribute flag, the non-random value indicating a requirement of a secret value that is generated as the CSRF token accompanying the operation request.

14. The method of claim 9, further comprising:
performing the first operation based at least in part on the attribute flag determined to be present in a header of the operation request, and further based at least in part on a secret value that is generated as the CSRF token accompanying the operation request.

15. The method of claim 9, further comprising:
performing the second operation is based at least in part on the attribute flag, and on a secret value that is generated as the CSRF token not accompanying the operation request.

16. A mobile device executing a web browser, the mobile device comprising:
one or more processors; and
one or more non-transitory computer-readable media storing computer-executable instructions that, when executed by the one or more processors, cause the one or more processors to perform operations comprising:
transmitting a first request with an attribute flag, the attribute flag comprising a value indicating whether or not a cross site request forgery (CSRF) token needs to accompany a cookie in an operation request, the CSRF token being associated with an internal secret utilized to generate a session to provide services for the mobile device;
receiving a response, the response comprising the cookie and the CSRF token, the cookie comprising the attribute flag and session properties associated with session; and
transmitting the operation request, the operation request comprising the cookie with the attribute flag, the operation being performed based at least in part on the attribute flag and the CSRF token being transmitted along with the operation request.

17. The web browser of claim 16, wherein:
the first request is a session request; and
a non-random value flag is utilized to generate the cookie and to set the value of the attribute flag being inserted in a header of the session request.

18. The web browser of claim 16, wherein:
the session is generated based at least in part on the first request;
the session is hashed with an internal secret utilized to generate a secret value as the CSRF token; and a requirement for the secret value is indicated by the attribute flag.

19. The web browser of claim 16, wherein:

a secret value is generated as the CSRF token; and the cookie further comprises session properties associated with the session.

20. The web browser of claim 16, wherein the response is a first response received from an application program interface (API) gateway, further comprising:

receiving a second response from the API gateway, the second response comprising data indicating that a third request received by the API gateway was declined based at least in part on the third request being received without any CSRF token.

* * * * *